(12) United States Patent
Zhang et al.

(10) Patent No.: US 7,653,225 B2
(45) Date of Patent: Jan. 26, 2010

(54) METHOD AND SYSTEM FOR GROUND GLASS NODULE (GGN) SEGMENTATION WITH SHAPE ANALYSIS

(75) Inventors: Li Zhang, Skillman, NJ (US); Ming Fang, Princeton Jct., NJ (US)

(73) Assignee: Siemens Corporation, Iselin, NJ (US)

( * ) Notice: Subject to any disclaimer, the term of this patent is extended or adjusted under 35 U.S.C. 154(b) by 753 days.

(21) Appl. No.: 10/942,477

(22) Filed: Sep. 16, 2004

(65) Prior Publication Data

US 2006/0120585 A1 Jun. 8, 2006

Related U.S. Application Data

(60) Provisional application No. 60/503,602, filed on Sep. 17, 2003.

(51) Int. Cl.
*G06K 9/00* (2006.01)
(52) U.S. Cl. .................................. 382/128; 128/922
(58) Field of Classification Search ................ 382/100, 382/128, 129, 130, 131, 132; 128/922; 378/4–27
See application file for complete search history.

(56) References Cited

U.S. PATENT DOCUMENTS 6,466,687 B1 * 10/2002 Uppaluri et al. ............. 382/128
6,728,334 B1 * 4/2004 Zhao ............................ 378/62
6,819,790 B2 * 11/2004 Suzuki et al. ............... 382/156
7,209,581 B2 * 4/2007 Zhang et al. ................ 382/131
7,236,619 B2 * 6/2007 Doi et al. .................... 382/128
7,289,653 B2 * 10/2007 Zhang et al. ................ 382/131

OTHER PUBLICATIONS

Zhang Li et al: "Consistent interactive segmentation of pulmonary ground glass nodules identified in CT studies" Proc SPIE Int Soc Opt Eng; Proceedings of SPIE—The International Society for Optical Engineering; Progress in Biomedical Optics and Imaging—Medical Imaging 2004: Imaging Processing 2004, vol. 5370 III, 2004, pp. 1709-1719, XP002302735 the whole document.
WO 01/78005 A (Yankelevitz David ; Cornell Res Foundation Inc (US); Henschke Claudia) Oct. 18, 2001 claims 46-69 p. 25, line 16_p. 29, line 26 p. 37, line 10_p. 38, line 25 p. 50, line 7_p. 64, line 6.

(Continued)

*Primary Examiner*—Anand Bhatnagar
(74) *Attorney, Agent, or Firm*—Donald B. Paschburg; F. Chau & Associates, LLC

(57) ABSTRACT

A method for segmentation of a ground glass nodule included in a volume of interest in a medical image and segmented by a process such as a Markov random field process, includes: identifying vessels in the volume of interest; segmenting the vessels; and removing segmented vessels from the segmented ground glass nodule.

61 Claims, 5 Drawing Sheets

OTHER PUBLICATIONS

Choi S M et al: "Volumetric Object Reconstruction Using the 3D—MRF Model—Based Segmentation" IEEE Transactions on Medical Imaging, IEEE Inc. New York, US, vol. 16, No. 6, Dec. 1, 1997, pp. 887-892, XP000738200 ISSN: 0278-0062 p. 888-890.

Li H D et al: Markov Random Field for IEEE Transactions on Medical Imaging, IEEE Inc. New York, US, vol. 14, No. 3, Sep. 1995 (Sep. 1, 1995), pp. 565-576, XP000527218 ISSN: 0278-0062 p. 566-569.

Li Fan et al: "Automatic detection of lung nodules from multi—slice low—dose CT images" Proceedings of the SPIE—The International Society for Optical Engineering SPIE—Int. Soc. Opt. Eng USA, vol. 4322, Jul. 3, 2001, pp. 1828-1835, XP002302736 ISSN: 0277-786X p. 1828-1831.

Kawata Y et al: "Pulmonary nodule integrating boundary and region information" Proceedings of the SPIE—The International Society for Optical Engineering SPIE—Int. Soc. Opt. Eng USA, vol. 5032, May 2003, pp. 1520-1530, XP002309408 ISSN: 0277-786X the abstract chapter 2: "Vessel Removal".

* cited by examiner

METHOD AND SYSTEM FOR GROUND GLASS NODULE (GGN) SEGMENTATION WITH SHAPE ANALYSIS

CROSS-REFERENCE TO RELATED APPLICATIONS PRIORITY

Specific reference is hereby made to U.S. Provisional Application No. 60/503,602, entitled IMPROVED GGO NODULE SEGMENTATION WITH SHAPE ANALYSIS, filed Sep. 17, 2003 in the name of Li Zhang and Ming Fang, the inventors in the present application, and of which the benefit of priority is claimed and whereof the disclosure is hereby incorporated herein by reference.

FIELD OF THE INVENTION

The present invention relates to the field of nodule segmentation and, more particularly, ground glass nodule (GGN) segmentation in pulmonary computed tomographic (CT) volumes.

BACKGROUND OF THE INVENTION

In radiographic examinations, particularly in pulmonary examinations, "Ground glass nodules" (GGNs) generally refer to radiographic appearances of hazy lung opacities not associated with an obscuration of underlying vessels. GGNs are typically found in two forms, "pure" and "mixed". Pure GGNs do not include solid components, whereas mixed GGNs include some solid components.

GGNs are more clearly shown in high resolution computed tomographic (HRCT) images than in plain radiographs. GGNs typically also exhibit a different appearance from solid nodules in HRCT images because solid nodules have a higher contrast and well defined boundaries. In addition, the appearance of GGNs in HRCT images is a highly significant finding as they often indicate the presence of an active and potentially treatable process such as bronchiolalveolar carcinomas or invasive adenocarcinoma.

Because GGNs are typically associated with active lung disease, the presence of GGNs often leads to further diagnostic evaluation, including, for example, lung biopsy. Thus, a computer-based segmentation can be of assistance to medical experts for diagnosis and treatment of certain types of lung disease. Accordingly, there is a need for a system and method of computer-based segmentation that can be used to accurately and consistently segment GGNs for quick diagnosis.

SUMMARY OF THE INVENTION

It is herein recognized that it has hitherto been impracticable to impose high level shape constraints from anatomical knowledge during the segmentation procedure. It is also herein recognized that when a GGN is attached to a vessel, the vessel boundary region may be included in the nodule segmentation since boundary regions of vessels typically have the similar intensity distributions as the GGN's due to the partial volume effect, and the GGN segmentation may include nearby vessel trees or other structures, such as lobar fissures, or scar tissues.

It is an object of the present invention to provide a method to separate GGNs from attached vessels by performing anatomically guided shape analysis.

In accordance with an aspect of the invention, a method for ground glass nodule (GGN) segmentation, includes: segmenting vessels in a VOI; identifying vessels in the VOI and removing segmented vessels from the VOI. Thresholding analysis and shape analysis are utilized to distinguish vessels from a GGN. Smoothing is optionally performed by a morphological operation.

In accordance with another aspect of the invention, a method for segmentation of a ground glass nodule (GGN) included in a volume of interest (VOI) in a medical image and segmented by a Markov random field (MRF) process, comprises: identifying vessels in the VOI; segmenting the vessels; and removing segmented vessels from the segmented GGN.

In accordance with another aspect of the invention, the step of identifying the vessels comprises performing a thresholding and connected component analysis.

In accordance with another aspect of the invention, the step of identifying the vessels comprises performing a 3D compactness analysis.

In accordance with another aspect of the invention, the step of segmenting the vessels comprises performing intensity constrained dilation.

In accordance with another aspect of the invention, a method for segmentation includes a step of performing a morphological operation following the step of removing segmented vessels.

In accordance with another aspect of the invention, a method for segmentation includes a step of removing any chest wall from the VOI.

In accordance with another aspect of the invention, the step of removing a chest wall from the VOI comprises distinguishing the chest wall from vessels based on the fact that the chest wall is always located on a corner of the VOI.

In accordance with another aspect of the invention, the step of removing a chest wall from the VOI comprises utilizing a region growing technique to remove an area that belongs to the chest wall.

In accordance with another aspect of the invention, a method for segmentation includes a step of morphological opening to remove small branches, in the order of and smaller than the GGN, resulting from the step of removing segmented vessels.

In accordance with another aspect of the invention, a method for segmentation includes a step of detecting the GGN utilizing a computer-aided GGN detection technique.

In accordance with another aspect of the invention, a method for segmentation includes a step of detecting the GGN utilizing a manual technique for detecting the GGN.

In accordance with another aspect of the invention, the GGN comprises a pure GGN and a mixed GGN.

In accordance with another aspect of the invention, the step of identifying vessels comprises: applying thresholding with a sufficiently high threshold $T_{high}$, so as to identify vessels and thereby derive a thresholded VOI; utilizing a process of connected component labeling on the thresholded VOI to find high intensity regions; utilizing 3-dimensional (3D) compactness of the high intensity regions to distinguish vessels from solid components in the GGN; applying thresholding with a low threshold $T_{low}$ lower than the high threshold $T_{high}$, to obtain a more complete vessel segmentation.

In accordance with another aspect of the invention, the step of segmenting vessels VOI comprises applying an intensity constrained dilation so as to include boundary voxels into the vessel segmentation.

In accordance with another aspect of the invention, the step of segmenting vessels comprises applying an intensity constrained dilation so as to include boundary voxels into the vessel segmentation and obtain an essentially complete vessel segmentation $O_v$ as follows:

$$O_v = O_{vc} \cup \{\bar{x}|\bar{x} \in (O_{vc} \oplus SE - O_{vc}) \text{ and } I_{-x} \geq T_{low}\},$$

wherein $O_{vc}$ is the vessel core part segmentation obtained from the foregoing step wherein vessels are distinguished from solid components in the GGN, $\oplus$ denotes morphological dilation, and SE is a dilation structure element, $I_{-x}$ is an intensity value at location $\bar{x}$, and $T_{low}$ the lower threshold; and the step of removing segmented vessels from the initially segmented GGN comprises removing the essentially complete vessel segmentation $O_v$ from the segmented VOI obtained in the step of segmenting the VOI using a Markov random field (MRF) procedure, so as to obtain a final GGN segmentation without vessels $O_{onlyggo} = O_{initggo} - O_v$.

In accordance with another aspect of the invention, the dilation structure element is 3×3×3 voxel cube.

In accordance with another aspect of the invention, a method for segmentation comprises applying a morphological opening operation, constrained by intensity, to $O_{onlyggn}$ so as to obtain a cleaned final GGN segmentation $O_{ggn}$, free of any remaining extra branches due to erroneous vessel inclusion resulting from a GGN intensity model including lower intensities than boundary vessel voxels, as follows:

$$O_{ggn} = (O_{onlyggn} \circ SE) - (\{\bar{x}|\bar{x} \in (O_{onlyggn} \circ SE)\} \cap \{\bar{x}| \bar{x} \notin O_{onlyggn}\} \cap \{\bar{x}|I_{-x} < T_{low}\}),$$

wherein $\circ$ denotes morphological opening, SE is a structuring element, and wherein in the foregoing equation, the part before the minus sign is the general form of morphological opening, and the part following the minus sign imposes an intensity constraint such that if a pixel added by dilation is lower than the threshold $O_{ggn}$, then this pixel is removed from the cleaned final segmentation In accordance with another aspect of the invention, the structuring element SE is a 2D disk.

In accordance with another aspect of the invention, a system for segmentation of a ground glass nodule (GGN) included in a volume of interest (VOI) in a medical image and segmented by a Markov random field (MRF) process, comprises: a memory device for storing a program; and a digital processor coupled to the memory device, the processor being operative with the program to: distinguish vessels from the VOI, segment vessels in the initially segmented VOI, and remove segmented vessels from the segmented GGN in the VOI.

In accordance with another aspect of the invention, the processor is operative with the program to remove a chest wall from the VOI.

In accordance with another aspect of the invention, the processor is operative with the program to distinguish the chest wall from vessels.

In accordance with another aspect of the invention, the processor is operative with the program to distinguish the chest wall from vessels based on the fact that the chest wall is always located on a corner of the VOI.

In accordance with another aspect of the invention, the processor is operative with the program to utilize a region growing technique to remove an area that belongs to the chest wall.

In accordance with another aspect of the invention, the processor is operative with the program to apply a morphological opening operation to remove small branches, in the order of and less than the size of the GGN, resulting from the step of removing vessels from the segmented GGN in the VOI.

In accordance with another aspect of the invention, the processor is operative with the program to detect the GGN utilizing a computer-aided GGN detection technique.

In accordance with another aspect of the invention, the processor is operative with the program to detect the GGN utilizing a manual technique for detecting the GGN.

In accordance with another aspect of the invention, the GGN comprises a pure GGN and a mixed GGN.

In accordance with another aspect of the invention, the processor being operative with the program: applies thresholding with a sufficiently high threshold $T_{high}$, so as to identify vessels and thereby derive a thresholded VOI; utilizes a process of connected component labeling on the thresholded VOI to find high intensity regions; utilizes a process of compactness analysis to identify vessels from high intensity regions; utilizes 3-dimensional (3D) compactness of the high intensity regions to distinguish vessels from solid components in the GGN; and applies thresholding with a low threshold $T_{low}$, lower than the high threshold $T_{high}$, to obtain a more complete vessel segmentation.

In accordance with another aspect of the invention, the processor, being operative with the program applies an intensity constrained dilation so as to include boundary voxels into the vessel segmentation.

In accordance with another aspect of the invention, the processor, being operative with the program, applies an intensity constrained dilation so as to include boundary voxels into the vessel segmentation and obtain an essentially complete vessel segmentation $O_v$, as follows:

$$O_v = O_{vc} \cup \{\bar{x}|\bar{x} \in (O_{vc} \oplus SE - O_{vc}) \text{ and } I_{-x} \geq T_{low}\},$$

wherein $O_{vc}$ is the vessel core part segmentation obtained from the foregoing operation wherein vessels are distinguished from solid components in the GGN, $\oplus$ denotes morphological dilation, and SE is a dilation structure element, $I_{-x}$ is an intensity value at location $\bar{x}$, and $T_{low}$ is the lower threshold; and the step of removing segmented vessels from the initially segmented GGN comprises removing the essentially complete vessel segmentation $O_v$ from an initial GGN segmentation $O_{initggo}$ of the GGN, so as to obtain GGN segmentation without vessels $O_{onlyggo} = O_{initggo} - O_v$.

In accordance with another aspect of the invention, the dilation structure element is 3×3×3 pixel cube.

In accordance with another aspect of the invention, the processor is operative with the program to apply a morphological opening operation, constrained by intensity, to $O_{onlyggn}$ so as to obtain a cleaned final GGN segmentation $O_{ggn}$, free of any remaining extra branches due to erroneous vessel inclusion resulting from a GGN intensity model including lower intensities than boundary vessel voxels, as follows:

$$O_{ggn} = (O_{onlyggn} \circ SE) - (\{\bar{x}|\bar{x} \in (O_{onlyggn} \circ SE)\} \cap \{\bar{x}| \bar{x} \notin O_{onlyggn}\} \cap \{\bar{x}|I_{-x} < T_{low}\}),$$

wherein $\circ$ denotes morphological opening, SE is a structuring element, and wherein in the foregoing equation, the part before the minus sign is the general form of morphological opening, and the part following the minus sign imposes an intensity constraint such that, if a pixel added by dilation is lower than the threshold $O_{ggn}$, then this pixel is removed from the cleaned final segmentation In accordance with another aspect of the invention, the structuring element SE is a 2D disk.

In accordance with another aspect of the invention, a computer program product comprises a computer useable medium having computer program logic recorded thereon for program code: for segmentation of a ground glass nodule (GGN) included in a volume of interest (VOI) in a medical image and segmented by a Markov random field (MRF) process by: identifying vessels from the VOI, segmenting vessels in the VOI, and removing segmented vessels from the VOI.

In accordance with another aspect of the invention, a method for segmentation of a ground glass nodule (GGN) included in a volume of interest (VOI) in a medical image and segmented by a Markov random field (MRF) process, comprises: identifying vessels from the VOI; segmenting the vessels; removing segmented vessels from the segmented GGN in the VOI segmented by the MRF process; applying a morphological opening operation to remove small branches resulting from the step of removing segmented vessels from the initially segmented GGN; applying thresholding with a sufficiently high threshold $T_{high}$, so as to identify vessels and thereby derive a thresholded VOI; utilizing a process of connected component labeling on the thresholded VOI to find high intensity regions; utilizing 3-dimensional (3D) compactness of the high intensity regions to distinguish vessels from solid components in the GGN; and applying thresholding with a low threshold $T_{low}$, lower than the high threshold $T_{high}$, to obtain a more complete vessel segmentation.

In accordance with another aspect of the invention, a method for segmentation of a ground glass nodule (GGN) included in a volume of interest (VOI) in a medical image and having been segmented, comprises: identifying vessels in the VOI; segmenting the vessels; and removing segmented vessels from the segmented GGN.

In accordance with another aspect of the invention, a method for segmentation of a ground glass nodule (GGN) included in a volume of interest (VOI) in a medical image and segmented by a process such as a Markov random field (MRF) process, includes: identifying vessels in the VOI; segmenting the vessels; and removing segmented vessels from the segmented GGN.

BRIEF DESCRIPTION OF THE DRAWINGS

These and other features of the invention will become apparent and be more clearly understood from the description which follows, in conjunction with the drawings, in which.

DETAILED DESCRIPTION OF EXEMPLARY EMBODIMENTS

Figure 1:
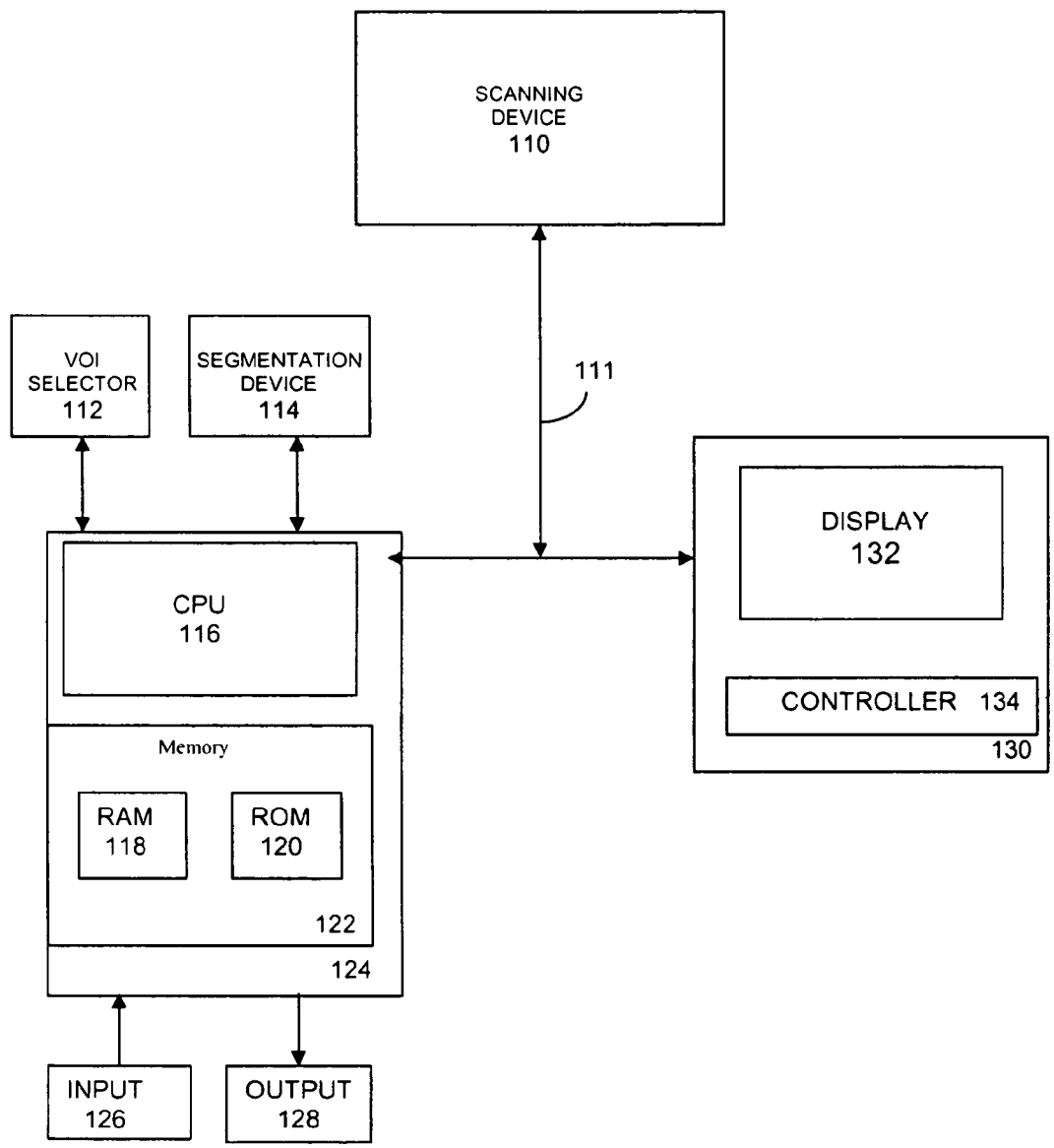
FIG. 1 shows a block diagram of a suitable system for ground glass nodule (GGN) segmentation according to an exemplary embodiment of the present invention.

FIG. 1 is a block diagram of a suitable system for ground glass nodule (GGN) segmentation according to an exemplary embodiment of the present invention. As shown in FIG. 1, the system includes, inter alia, a scanning device 110, a computer 124 which may be a personal computer (PC), and an operator's console and/or virtual navigation terminal 130 connected or coupled directly or indirectly in any suitable and convenient manner, such as over an Ethernet network 111, for example. The scanning device 110 is preferably a high-resolution computed tomography (HRCT) imaging device.

The computer 124, which conveniently may be a portable or laptop computer, a desktop computer, a personal digital assistant (PDA), or other suitable form of computer, includes a central processing unit (CPU) 116 and a memory 122, which are coupled to an input 126 and an output 128. Computer 124 is coupled to a volume of interest (VOI) selector 112 and a segmentation device 114 that includes means for practicing one or more methods for ground glass nodule (GGN) segmentation. Computer 124 may also be coupled to and/or include a diagnostic module, which is used to perform automated diagnostic or evaluation functions of medical image data. In addition, computer 124 may be further coupled to a lung volume examination device (not shown).

Memory 122 includes a random access memory (RAM) 118 and a read only memory (ROM) 120. Memory 122 can also include a database, disk drive, tape drive, etc., or a combination thereof. RAM 118 functions as a data memory that stores data used during execution of a program in CPU 116 and is used as a work area. ROM 120 functions as a program memory for storing a program executed in CPU 116. Input 126 comprises a keyboard, a computer mouse, and/or other input devices, and output 128 comprises a display such as a liquid crystal display (LCD), cathode ray tube (CRT) display, printer, and so forth.

The operation of the system is controlled from the operator's console 130, which includes a controller 134, for example, a keyboard, and a display 132, for example, a CRT display. The operator's console 130 communicates with computer 124 and scanning device 110 so that two-dimensional (2D) image data collected by scanning device 10 can be rendered into 3D data by computer 124 and viewed on display 132. It is to be understood that computer 124 can be configured to operate and display information provided by scanning device 110 absent the operator's console 130, using, for example, input 126 and output 128 devices to execute certain tasks performed by controller 134 and display 132.

The operator's console 130 further includes any suitable image rendering system/tool/application that can process digital image data of an acquired image dataset (or portion thereof) to generate and display 2D and/or 3D images on display 132. More specifically, the image rendering system may be an application that provides 2D/3D rendering and visualization of medical image data, and which executes on a general purpose or specific computer workstation. Moreover, the image rendering system enables a user to navigate through a 3D image or a plurality of 2D image slices.

Computer 124 may also include an image rendering system/tool/application for processing digital image data of an acquired image dataset to generate and display 2D and/or 3D images.

As shown in FIG. 1, segmentation device 114 is also used by computer 124 to receive and process digital medical image data, which as noted above, may be in the form of raw image data, 2D reconstructed data (e.g., axial slices), or 3D reconstructed data such as volumetric image data or multiplanar reformats, or any combination of such formats. The data processing results can be output from computer 124 via the coupling or connection path or network 111 to an image rendering system in the operator's console 130 for generating 2D and/or 3D renderings of image data in accordance with the data processing results, such as segmentation of organs or anatomical structures, color or intensity variations, and so forth.

It is to be understood that the system and method according to the present invention for GGN segmentation may be implemented as extensions to segmentation methods used for processing medical image data. For example, applicants' copending patent application Ser. No. 10/898,511, entitled SYSTEM AND METHOD FOR GROUND GLASS NODULE (GGN) SEGMENTATION, filed Jul. 23, 2004 in the name of Li Zhang and Ming Fang and whereof the entire disclosure is hereby incorporated by reference herein, discloses a system and method for segmentation utilizing a Markov random field (MRF).

Further, it is to be appreciated that exemplary systems and methods described herein can be readily implemented with 3D medical images and computer-aided diagnosis (CAD) systems or applications that are adapted for a wide range of imaging modalities (e.g., CT, MRI, etc.) and for diagnosing and evaluating various abnormal pulmonary structures or lesions such as lung nodules, tumors, stenoses, inflamed regions, etc. In this regard, although exemplary embodiments may be described herein with reference to particular imaging modalities or particular anatomical features, this should not be construed as limiting the scope of the invention.

It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a computing machine comprising any suitable architecture.

Figure 2:
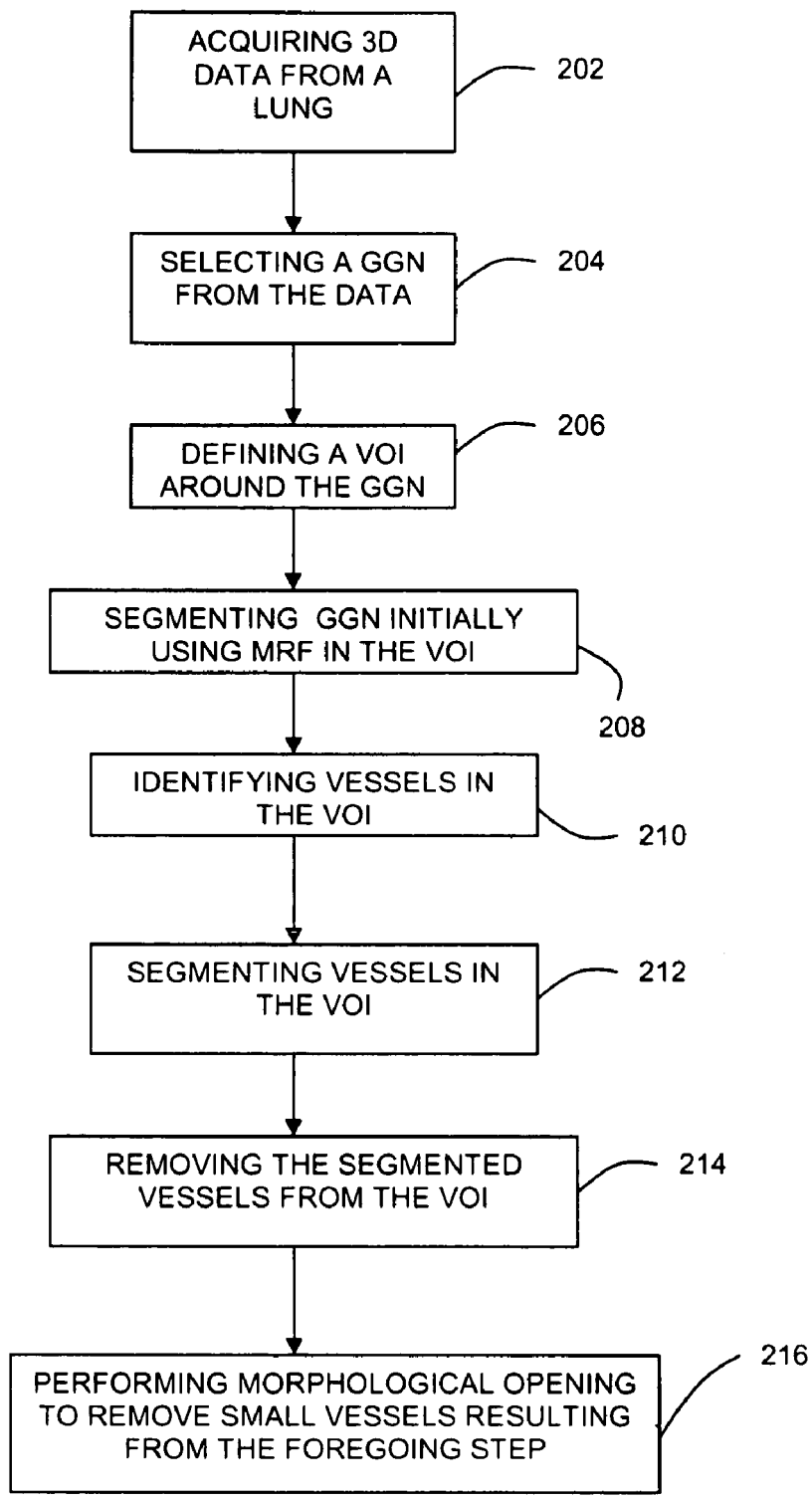
FIG. 2 shows a flow chart in accordance with principles of the present invention.

FIG. 2 shows a flowchart illustrating in outline an operation of a method for GGN segmentation according to an exemplary embodiment of the present invention, in conjunction with typically preliminary operations.

As shown in FIG. 2, 3D data is acquired from a lung or pair of lungs (step 202). This is accomplished by using the scanning device 110, for example, an HRCT scanner, to scan a lung thereby generating a series of 2D images associated with the lung. The 2D images of the lung may then be converted or transformed into a 3D rendered image, by one of various methods known, per se, in the art. The image data is preprocessed. For example, when a GGN is close to the lung boundary, part of a chest wall may also be included in the VOI. In this instance, a chest wall is removed from the VOI. Thus, for example, a portion of the VOI that belongs to the chest wall is excluded from the VOI. This step may utilize, for example, a region growing technique to remove the area that belongs to the chest wall and thus its potential influence is removed from further processing techniques, such as MRF segmentation and the shape analysis follow in accordance with the present invention. It is to be understood that a variety of segmentation techniques may be used in the preprocesseing in addition to region growing. For material on region growing, see, for example, Arthur R. Weeks, "Fundamentals of Image Processing," IEEE Press, New York 1996, pp. 442 et seq., 448 et seq.; Gonzalez and Woods, "Digital Image Processing," Prentice-Hall, New Jersey 2002, p. 612 et seq.; Milan Sonka et al. "Image Processing, Analysis, and Machine Vision," $2^{nd}$ ed., PWS Publishing, New York, 1999, p. 176 et seq., inter alia. The image is segmented using a Markov random field (MRF) technique to obtain initial GGN segmentation, in accordance with applicants' above-referenced pending patent application Ser. No. 10/898,511. A GGN is selected (step 204). This is accomplished, for example, by a medical professional such as a radiologist manually selecting a GGN from the data, or by using a computer-aided GGN detection and/or characterization technique. As an alternative, a point in the GGN may be selected. This process may also be performed manually by a radiologist examining the data associated with the lung or pair of lungs, or automatically by a computer programmed to identify points in GGNs in medical image data.

After the GGN is selected, a VOI is defined around the GGN using, for example, the VOI selector 112 (step 206). In this step, the size of the VOI is defined automatically to include the GGN.

In step 208, the GGN is initially segmented using a Markov random field procedure in the VOI.

Then, in accordance with principles of the present invention, vessels are identified from the VOI in step 210 by a technique including thresholding, connected component analysis, and compactness analysis.

In step 212, complete segmentation of vessels in the VOI or GGN segmentation is carried out by dilation, with an intensity constraint.

In step 214, vessel segmentation is removed from the GGN segmentation.

In a further step 216, morphological opening, also constrained by intensity, is performed to delete, typically small, branches that are caused by removing vessels from GGN segmentation. Techniques for performing such operations are known in the art and are described in various textbooks; see, for example, material on morphological filtering (p. 180 et seq.) in the aforementioned book by Weeks; and the aforementioned book by Gonzalez et al., Chapter 9 Morphological Image Processing, p. 519 et seq.

The vessel segmentation and removal are performed in the VOI, which is a sub-volume around the manually input click point. Further details of the foregoing steps are described next.

As stated above, GGNs are typically found in "pure" and "mixed" forms. FIG. 3(A) and FIG. 3(B) show respective examples of the two forms. Pure GGNs do not include solid components, whereas mixed GGNs include some solid components.

As used herein, a Hounsfield unit (HU) for CT data sets describes the density of material and ranges from −1000 for air, through 0 for water, to higher values for materials of higher densities.

As stated above, the image is segmented using a Markov random field (MRF) technique to obtain initial GGN segmentation. Details of this procedure are given in applicants' above-referenced patent application Ser. No. 10/898,511, herein incorporated by reference. Briefly stated, the method and system for GGN segmentation as described in that application is as follows. An MRF, which specifies a nonlinear interaction between similar and different features, is used for example, to combine and organize spatial and temporal information by introducing generic knowledge about features to be estimated. For example, by applying an MRF in the step of segmenting the GGN, the MRF gives an a priori probability by applying spatial constraints from neighboring voxels in the VOI. A label can then be assigned to each voxel in the VOI by taking into account intensity and spatial constraints from neighboring voxels. Thus, GGNs can be given one label type and non-GGNs or background information, for example, lung parenchyma, blood vessels, chest wall portions, etc. are given another label type, thereby allowing the segmented VOI to be displayed discretely illustrating the GGNs and the background. See column (c) of FIG. 7 of applicants' aforementioned pending patent application Ser. No. 10/898,511, where an area denoted by a jagged edge in the center of the images illustrates the GGNs and the extraneous area is the background. For the full derivation of the MRF segmentation procedure in detail, see applicants' aforementioned pending patent application Ser. No. 10/898,511.

In order to identify vessels in accordance with the present invention, thresholding is applied in the VOI, first with a high threshold $T_{high}$ for example, −400 HU, to identify vessels. The process of connected component labeling is used on the thresholded VOI to find high intensity regions. For a description of connected component segmentation, see, for example, the aforementioned book by Weeks, pp. 448 et seq.; and the aforementioned book by Gonzalez et al., p. 664 et seq. The high intensity regions include vessel branches in the VOI and solid components in the GGN.

3D compactness of a high intensity region is then used to distinguish vessels from the solid components in the GGN, as will next be described.

Compactness refers to a known shape description characteristic independent of linear shape transformations. See, for example, the aforementioned book by Sonka et al., p. 259 The compactness of a 3D shape S is defined as follows $$C = V \Big/ \frac{4}{3}\pi R_d^3 \qquad \text{(Equation 1)}$$

where $R_d$, the radius of S, is calculated from the distance transform map of S, that is, $$R_d = \max\{D_{-\bar{x}} | \bar{x} \in S\}, \qquad \text{(Equation 2)}$$

where $D_{-\bar{x}}$ is the distance transform value at location $\bar{x}$. The distance transform as used herein assigns a value to each region pixel representing its shortest distance from the region's boundary. See, for example, the aforementioned book by Sonka et al. (p. 269).

Figure 4:
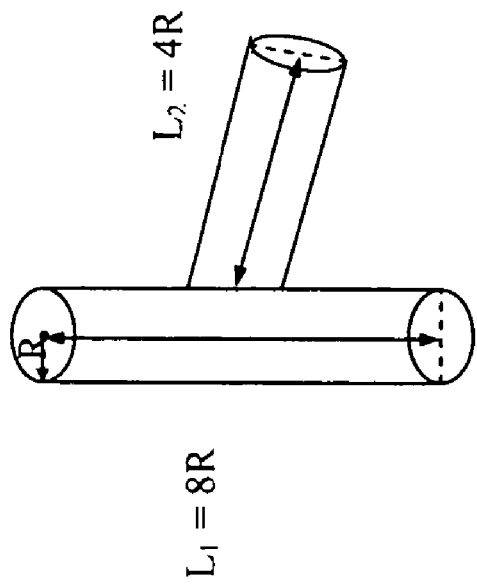
FIG. 4 shows the basis for compactness calculation for a sphere, a cylinder, and connected cylinders.
Figure 4:
Figure 4:
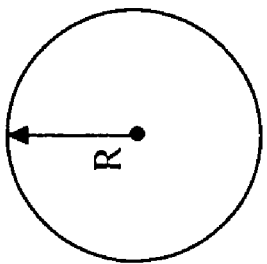

If we approximate the solid components in GGN segmentation as spheres, vessels in the VOI as cylinders or connected cylinders (see FIG. 4), then the vessels in the VOI are less compact than the solid components in GGN, and thus the vessel branches have much higher compactness values than the solid components in a GGN according to Equation 1. For example, the compactness values for the three different shapes shown in FIG. 4 can be calculated as follows.

$$C_{sphere} = 1 \qquad \text{(Equation 3)}$$

$$C_{cylinder} = \pi R^2 L \Big/ \frac{4}{3}\pi R^3 = 6$$

$$C_{cylinder} = \pi R^2 (L_1 + L_2) \Big/ \frac{4}{3}\pi R^3 = 9$$

From the above example, it is apparent that cylinders, whether a single cylinder or connected cylinders, are found to exhibit a high compactness value, whereas a sphere exhibits a low compactness value. Therefore, vessel branches in the VOI can be selected from high intensity regions by their high compactness value, for example, a compactness value greater than 3.

As mentioned above, when a GGN is close to the lung boundary, part of the chest wall may also be included in the VOI. The chest wall in the VOI is also a high intensity region, and may be less compact if only a narrow or irregular part thereof is included in the VOI. The chest wall can be distinguished from the vessels based on the fact that the chest wall is always located on a corner of said VOI.

In the vessel identification step, a high threshold is used to segment vessels. Due to the partial volume effect, boundary voxels that belong to vessels are not included. To complete the vessel segmentation, a lower threshold must be applied. However, a lower threshold had been utilized in the first step to find connected high intensity regions, lung parenchyma would be included and connected to vessels and, as a result, vessels cannot be identified. Thus, a high threshold must be first used to identify vessels and, once the vessels are identified, a lower threshold can then be used to get complete vessel segmentation.

To include the boundary voxels into the vessel segmentation, an intensity constrained dilation is used to get the complete vessel segmentation $O_v$ as follows $$O_v = O_{vc} \cup \{\bar{x} | \bar{x} \in (O_{vc} \oplus SE - O_{vc}) \text{ and } I_{-\bar{x}} \geq T_{low}\}, \qquad \text{Equation 4}$$

where $O_{vc}$ is the vessel core part segmentation obtained from the vessel identification step. $\oplus$ denotes morphological dilation, and SE is the dilation structure element (3×3×3 cube). $I_{-\bar{x}}$ is the intensity value at location $\bar{x}$, and $T_{low}$ is the lower threshold used to perform vessel segmentation, for example, $T_{low} = -624$.

Figure 5:
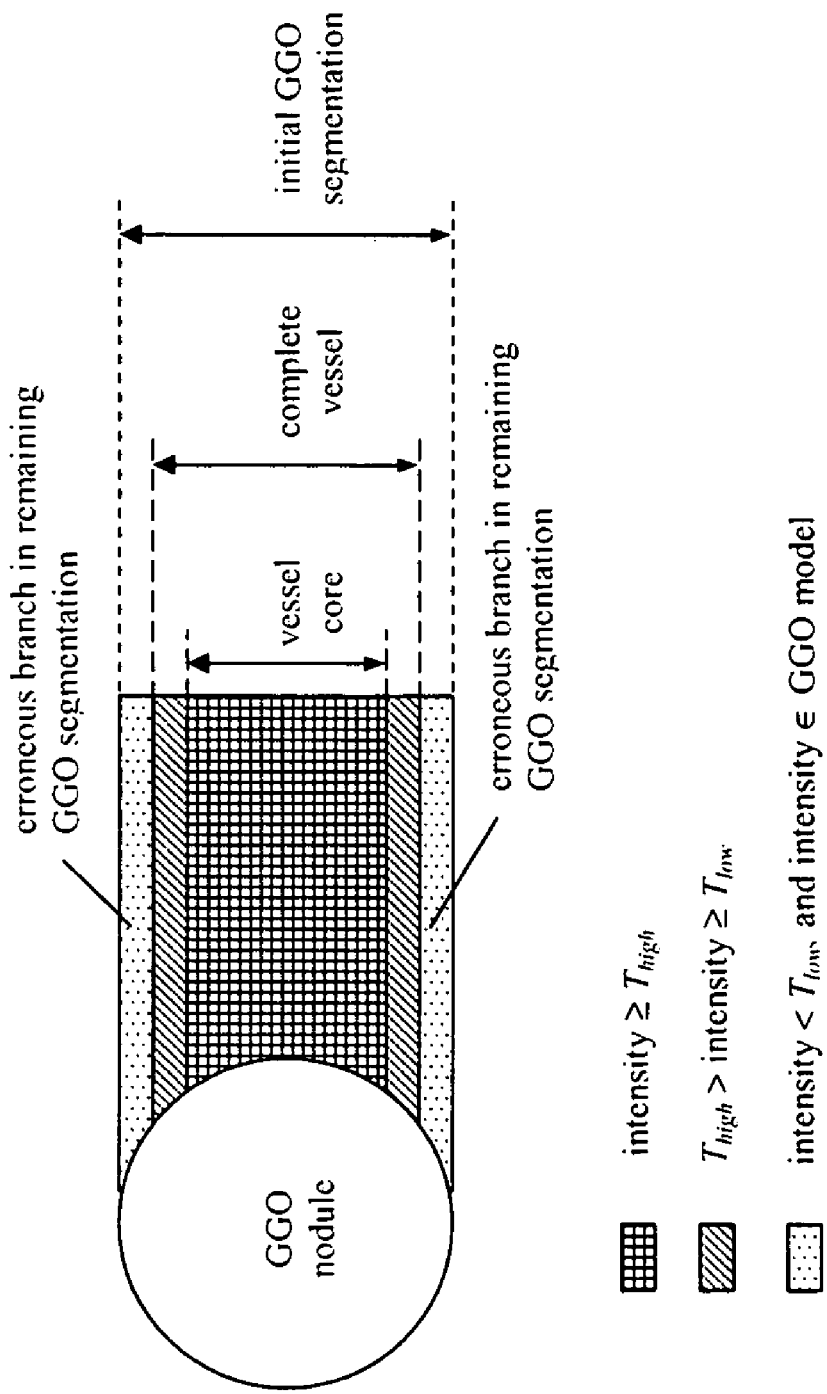
FIG. 5 shows in diagrammatic fashion erroneous branches in GGN segmentation caused by vessel inclusion.

The complete vessel segmentation $O_v$ is removed from the initial GGN segmentation $O_{initggo}$ to get the GGN segmentation without vessels $O_{onlyggo} = O_{initggo} - O_v$ Even after vessel segmentation removal, the remaining GGN segmentation may have extra small branches caused by erroneous vessel inclusion since the GGN intensity model includes lower intensities than boundary vessel voxels, as shown in FIG. 5.

Thus, as shown in FIG. 5, an erroneous branch remains in the GGN segmentation, with a low intensity of a value included in the range of the GGN model. Furthermore, other lung structures with high intensity, such as lobar fissures, scar tissue, and the like structures, may also cause erroneous branches in GGN segmentation. To remove such small branches, which are typically of smaller dimension than the diameter of the GGN, morphological opening, also constrained by intensity, is applied to $O_{onlyggn}$ in order to get a cleaned final GGN segmentation $O_{ggn}$ as follows.

$$O_{ggn} = (O_{onlyggn} \circ SE) - (\{\bar{x} | \bar{x} \in (O_{onlyggn} \circ SE)\} \cap \{\bar{x} | \bar{x} \notin O_{onlyggn}\} \cap \{\bar{x} | I_{-\bar{x}} < T_{low}\}), \qquad \text{(Equation 5)}$$

where ∘ denotes morphological opening and SE is a structuring element. In Equation 5, the part before the minus sign is the general form of morphological opening, and the part following the minus sign imposes an intensity constraint, that is, if a pixel added by dilation is lower than the threshold $O_{ggn}$, this pixel would be removed from the final segmentation. The intensity constraint prevents nearby dark voxels from being included in the GGN segmentation. The structuring element SE is a 2D disk since a one or two slice thick GGN segmentation could be deleted by morphological opening with a 3D structure element.

Figure 3:
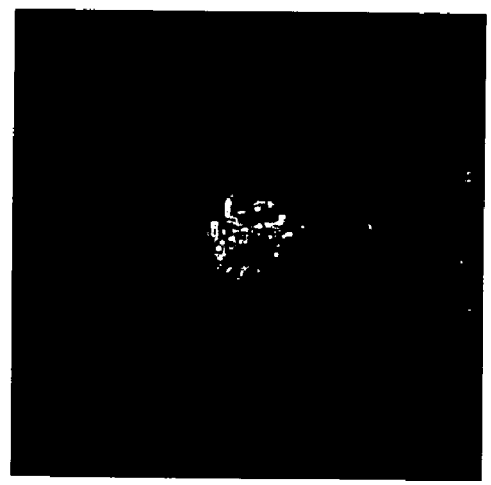
FIG. 3 shows: (a) an initial over-segmented GGN with vessels, (b) vessel segmentation, and (c) final nodule segmentation, without vessels, in accordance with principles of the present invention.
Figure 3:
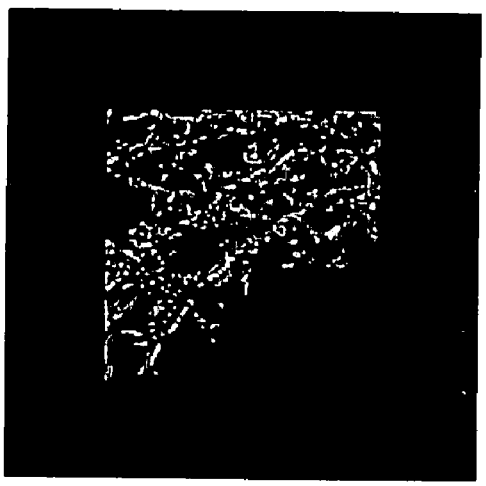
Figure 3:
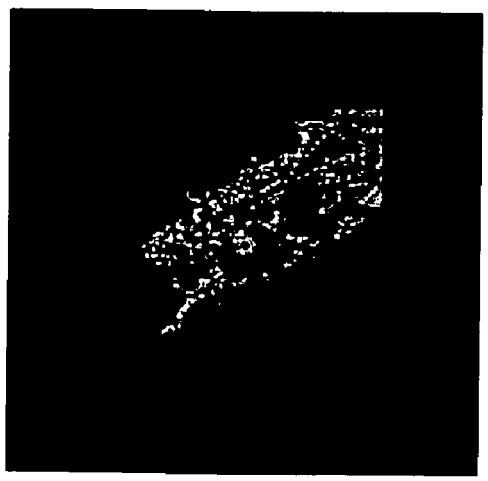

FIG. 3 shows an example of the application of the invention, where in FIG. 3(a), the initial result is a massive over-segmentation since the GGN is close to vessels. FIG. 3(b) shows the vessel segmentation in the VOI, and FIG. 3(c) shows the final GGN segmentation without over-segmented vessels.

As will be understood, the foregoing description is only representative of illustrative embodiments. For convenience in explaining the invention, the foregoing description has focused on a representative sample of possible embodiments, a sample that is illustrative of the principles of the invention and is not an exhaustive attempt to enumerate all possible variations. That alternative embodiments may not have been presented for a specific portion of the invention, or that further alternatives, not herein described, may be available for a portion, is not to be considered a disclaimer of those alternate embodiments. It is therefore intended that the invention not be limited to the specifically described embodiments; numerous permutations and combinations of the above and implementations involving non-inventive substitutions for the above can be created, but the invention is to be defined in accordance with the claims that follow. It can be appreciated that many such embodiments not herein described are within the scope of the following claims, and that others are equivalent. For example, while the illustrative embodiments utilize an image having been segmented by an MRF process, an image having been segmented by another, equivalent process may also be suitable for processing by the method of the present invention. These and the like other applications and embodiments can be straightforwardly implemented without departing from the spirit and scope of the present invention.

What is claimed is:

1. A computer-implemented method for segmentation of a ground glass nodule (GGN) included in a volume of interest (VOI) in a medical image and segmented by a Markov random field (MRF) process, said method performed by the computer comprising:
    identifying vessels in said VOI;
    segmenting said vessels; and
    removing segmented vessels from said segmented GGN.

2. A method as recited in claim 1, wherein said step of identifying said vessels comprises performing a thresholding and connected component analysis.

3. A method as recited in claim 1, wherein said step of identifying said vessels comprises performing a 3D compactness analysis.

4. A method as recited in claim 1, wherein said step of segmenting said vessels comprises performing intensity constrained dilation.

5. A method as recited in claim 1, including a step of performing a morphological operation following said step of removing segmented vessels.

6. A method as recited in claim 1, including a step of removing any chest wall from said VOI.

7. A method as recited in claim 6, wherein said step of removing a chest wall from said VOI comprises distinguishing said chest wall from vessels based on the fact that said chest wall is always located on a corner of said VOI.

8. A method as recited in claim 6, wherein said step of removing a chest wall from said VOI comprises utilizing a region growing technique to remove an area that belongs to said chest wall.

9. A method as recited in claim 1, comprising a step of morphological opening to remove small branches, in the order of and smaller than said GGN, resulting from said step of removing segmented vessels.

10. A method as recited in claim 1, including a step of detecting said GGN utilizing a computer-aided GGN detection technique.

11. A method as recited in claim 1, including a step of detecting said GGN utilizing a manual technique for detecting said GGN.

12. A method as recited in claim 1, wherein said GGN comprises a pure GGN and a mixed GGN.

13. A method as recited in claim 1, wherein said step of identifying vessels comprises:
    applying thresholding with a sufficiently high threshold $T_{high}$, so as to identify vessels and thereby derive a thresholded VOI;
    utilizing a process of connected component labeling on the thresholded VOI to find high intensity regions;
    utilizing 3-dimensional (3D) compactness of said high intensity regions to distinguish vessels from solid components in the GGN;
    applying thresholding with a low threshold $T_{low}$, lower than said high threshold $T_{high}$, to obtain a more complete vessel segmentation.

14. A method as recited in claim 13, wherein said step of segmenting vessels VOI comprises applying an intensity constrained dilation so as to include boundary voxels into said vessel segmentation.

15. A method as recited in claim 13, wherein said step of segmenting vessels comprises applying an intensity constrained dilation so as to include boundary voxels into said vessel segmentation and obtain an essentially complete vessel segmentation $O_v$ as follows:

$$O_v = O_{vc} \cup \{\bar{x} | \bar{x} \in (O_{vc} \oplus SE - O_{vc}) \text{ and } I_{\bar{x}} \geq T_{low}\},$$

wherein $O_{vc}$ is the vessel core part segmentation obtained from the foregoing step wherein vessels are distinguished from solid components in said GGN, $\oplus$ denotes morphological dilation, and SE is a dilation structure element, $I_{\bar{x}}$ is an intensity value at location $\bar{x}$, and $T_{low}$ is said lower threshold; and said step of removing segmented vessels from said initially segmented GGN comprises removing said essentially complete vessel segmentation $O_v$ from said segmented VOI obtained in said step of segmenting said VOI using a Markov random field (MRF) procedure, so as to obtain a final GGN segmentation without vessels $O_{onlyggo} = O_{initggo} - O_v$.

16. A method as recited in claim 15, wherein said dilation structure element is 3×3×3 voxel cube.

17. A method as recited in claim 1 comprising:
    applying a morphological opening operation, constrained by intensity, to so as to obtain a cleaned final GGN segmentation $O_{ggn}$, free of any remaining extra branches due to erroneous vessel inclusion resulting from a GGN intensity model including lower intensities than boundary vessel voxels, as follows:

$$O_{ggn} = (O_{onlyggn} \circ SE) - (\{\bar{x} | \bar{x} \in (O_{onlyggn} \circ SE)\} \cap \{\bar{x} | \bar{x} \in O_{onlyggn}\} \cap \{\bar{x} | I_{\bar{x}} < T_{low}\}),$$

wherein ∘ denotes morphological opening, SE is a structuring element, and wherein in the foregoing equation, the part before the minus sign is the general form of morphological opening, and the part following the minus sign imposes an intensity constraint such that if a pixel added by dilation is lower than the threshold $O_{ggn}$, then this pixel is removed from said cleaned final segmentation.

18. A method as recited in claim 17, wherein said structuring element SE is a 2D disk.

19. A system for segmentation of a ground glass nodule (GGN) included in a volume of interest (VOI) in a medical image and segmented by a Markov random field (MRF) process, said system comprising:
    a memory device for storing a program; and
    a digital processor coupled to said memory device, said processor being operative with said program to:
        distinguish vessels from said VOI,
        segment vessels in said initially segmented VOI, and
        remove segmented vessels from said segmented GGN in said VOI.

20. A system as recited in claim 19, wherein said processor is operative with said program to remove a chest wall from said VOI.

21. A system as recited in claim 20, wherein said processor is operative with said program to distinguish said chest wall from vessels.

22. A system as recited in claim 21, wherein said processor is operative with said program to distinguish said chest wall from vessels based on the fact that said chest wall is always located on a corner of said VOI.

23. A system as recited in claim 20, wherein said processor is operative with said program to utilize a region growing technique to remove an area that belongs to said chest wall.

24. A system as recited in claim 19, wherein said processor is operative with said program to apply a morphological opening operation to remove small branches, in the order of and less than the size of said GGN, resulting from said step of removing vessels from said segmented GGN in said VOI.

25. A system as recited in claim 24, wherein said processor is operative with said program to detect said GGN utilizing a computer-aided GGN detection technique.

26. A system method as recited in claim 24, wherein said processor is operative with said program to detect said GGN utilizing a manual technique for detecting said GGN.

27. A system as recited in claim 19, wherein said GGN comprises a pure GGN and a mixed GGN.

28. A system as recited in claim 19, wherein said processor being operative with said program:
applies thresholding with a sufficiently high threshold $T_{high}$, so as to identify vessels and thereby derive a thresholded VOI;
utilizes a process of connected component labeling on the thresholded VOI to find high intensity regions;
utilizes a process of compactness analysis to identify vessels from high intensity regions;
utilizes 3-dimensional (3D) compactness of said high intensity regions to distinguish vessels from solid components in the GGN; and
applies thresholding with a low threshold $T_{low}$, lower than said high threshold $T_{high}$, to obtain a more complete vessel segmentation.

29. A system as recited in claim 28, wherein said processor, being operative with said program applies an intensity constrained dilation so as to include boundary voxels into said vessel segmentation.

30. A system as recited in claim 28, wherein said processor, being operative with said program, applies an intensity constrained dilation so as to include boundary voxels into said vessel segmentation and obtain an essentially complete vessel segmentation $O_v$ as follows:

$$O_v = O_{vc} \cup \{\bar{x} | \bar{x} \in (O_{vc} \oplus SE - O_{vc}) \text{ and } I_{\bar{x}} \geq T_{low}\},$$

wherein $O_{vc}$ is the vessel core part segmentation obtained from the foregoing step wherein vessels are distinguished from solid components in said GGN, $\oplus$ denotes morphological dilation, and SE is a dilation structure element, $I_{\bar{x}}$ is an intensity value at location $\bar{x}$, and $T_{low}$ is said lower threshold; and
said step of removing segmented vessels from said initially segmented GGN comprises removing said essentially complete vessel segmentation $O_v$ from said segmented VOI obtained in said step of segmenting said VOI using a Markov random field (MRF) procedure, so as to obtain a final GGN segmentation without vessels $O_{onlyggo} = O_{initggo} - O_v$.

31. A system as recited in claim 30, wherein said dilation structure element is 3×3×3 voxel cube.

32. A system as recited in claim 28, wherein said processor is operative with said program to apply a morphological opening operation, constrained by intensity, to $O_{onlyggn}$ so as to obtain a cleaned final GGN segmentation $O_{ggn}$, free of any remaining extra branches due to erroneous vessel inclusion resulting from a GGN intensity model including lower intensities than boundary vessel voxels, as follows:

$$O_{gen} = (O_{onlyggn} \circ SE) - (\{\bar{x} | \bar{x} \in (O_{onlyggn} \circ SE)\} \cap \{\bar{x} | \bar{x} \notin O_{onlyggn}\} \cap \{\bar{x} | I_{\bar{x}} < T_{low}\}),$$

wherein $\circ$ denotes morphological opening, SE is a structuring element, and wherein in the foregoing equation, the part before the minus sign is the general form of morphological opening, and the part following the minus sign imposes an intensity constraint such that if a pixel added by dilation is lower than the threshold $O_{ggn}$, then this pixel is removed from said cleaned final segmentation.

33. A system as recited in claim 32, wherein said structuring element SE is a 2D disk.

34. A computer program product comprising a computer useable medium having computer program logic recorded thereon for program code:
for segmentation of a ground glass nodule (GGN) included in a volume of interest (VOI) in a medical image and segmented by a Markov random field (MRF) process by:
identifying vessels from said VOI,
segmenting vessels in said VOI, and
removing segmented vessels from said VOI.

35. A computer-implemented method for segmentation of a ground glass nodule (GGN) included in a volume of interest (VOI) in a medical image and segmented by a Markov random field (MRF) process, said method performed by the computer comprising:
identifying vessels from said VOI;
segmenting said vessels;
removing segmented vessels from said segmented GGN in said VOI segmented by said MRF process;
applying a morphological opening operation to remove small branches resulting from said step of removing segmented vessels from said initially segmented GGN;
applying thresholding with a sufficiently high threshold $T_{high}$, so as to identify vessels and thereby derive a thresholded VOI;
utilizing a process of connected component labeling on the thresholded VOI to find high intensity regions;
utilizing 3-dimensional (3D) compactness of said high intensity regions to distinguish vessels from solid components in the GGN; and
applying thresholding with a low threshold $T_{low}$, lower than said high threshold $T_{high}$, to obtain a more complete vessel segmentation.

36. A method as recited in claim 35, wherein said step of segmenting vessels in said VOI comprises applying an intensity constrained dilation so as to include boundary voxels into said vessel segmentation.

37. A method as recited in claim 35, wherein said step of segmenting vessels in said VOI comprises applying an intensity constrained dilation so as to include boundary voxels into said vessel segmentation and obtain an essentially complete vessel segmentation $O_v$ as follows:

$$O_v = O_{vc} \cup \{\bar{x} | \bar{x} \in (O_w \oplus SE - O_{vc}) \text{ and } I_{\bar{x}} \geq T_{low}\},$$

wherein $O_{vc}$ is the vessel core part segmentation obtained from the foregoing step wherein vessels are distinguished from solid components in said GGN, $\oplus$ denotes morphological dilation, and SE is a dilation structure element, $I_{\bar{x}}$ is an intensity value at location, and $T_{low}$ is said lower threshold; and
said step of removing segmented vessels from said initially segmented GGN comprises removing said essentially complete vessel segmentation $O_v$ from said segmented VOI obtained in said step of segmenting said VOI using a Markov random field (MRF) procedure, so as to obtain a final GGN segmentation without vessels $O_{onlyggn}=O_{initggo}-O_v$.

38. A method as recited in claim 37, including a step of removing a chest wall from said VOI.

39. A method as recited in claim 38, wherein said step of removing a chest wall from said VOI comprises distinguishing said chest wall from vessels based on the fact that said chest wall is always located on a corner of said VOI.

40. A method as recited in claim 38, wherein said step of removing a chest wall from said VOI comprises utilizing a region growing technique to remove an area that belongs to said chest wall.

41. A method as recited in claim 38, including a step of detecting said GGN utilizing a computer-aided GGN detection technique.

42. A method as recited in claim 38, wherein said step of applying a morphological opening operation comprises:
applying a morphological opening operation, constrained by intensity, to $O_{onlyggn}$ so as to obtain a cleaned final GGN segmentation $O_{ggn}$, free of any remaining extra branches due to erroneous vessel inclusion resulting from a GGN intensity model including lower intensities than boundary vessel voxels, as follows:

$$O_{ggn}=(O_{onlyggn} \circ SE)-(\{\bar{x}|\bar{x}\in(O_{onlyggn}\circ SE)\}\cap\{\bar{x}| \bar{x}\notin O_{onlyggn}\}\cap\{\bar{x}|I_{\bar{x}}<T_{low}\}),$$

wherein ∘ denotes morphological opening, SE is a structuring element, and wherein in the foregoing equation, the part before the minus sign is the general form of morphological opening, and the part following the minus sign imposes an intensity constraint such that if a pixel added by dilation is lower than the threshold $O_{ggn}$, then this pixel is removed from said cleaned final segmentation.

43. A method as recited in claim 42, wherein said structuring element SE is a 2D disk.

44. A method as recited in claim 35, including a step of detecting said GGN utilizing a manual technique for detecting said GGN.

45. A method as recited in claim 35, wherein said GGN comprises a pure GGN and a mixed GGN.

46. A method as recited in claim 35, wherein said step of segmenting vessels VOI comprises applying an intensity constrained dilation so as to include boundary voxels into said vessel segmentation.

47. A computer-implemented method for segmentation of a ground glass nodule (GGN) included in a volume of interest (VOI) in a medical image and having been segmented, said method performed by the computer comprising:
identifying vessels in said VOI;
segmenting said vessels; and
removing segmented vessels from said segmented GGN.

48. A method as recited in claim 47, including a step of removing a chest wall from said VOI.

49. A method as recited in claim 48, wherein said step of removing a chest wall from said VOI comprises distinguishing said chest wall from vessels by said chest wall being always located on a corner of said VOI.

50. A method as recited in claim 48, wherein said step of removing a chest wall from said VOI comprises utilizing a region growing technique to remove an area belonging to said chest wall.

51. A method as recited in claim 47, comprising a step of applying a morphological opening operation to remove small branches, in the order of and smaller than said GGN, resulting from said step of removing segmented vessels.

52. A method as recited in claim 47, including a step of detecting said GGN utilizing a computer-aided GGN detection technique.

53. A method as recited in claim 47, including a step of detecting said GGN utilizing a manual technique for detecting said GGN.

54. A method as recited in claim 47, wherein said GGN comprises a pure GGN and a mixed GGN.

55. A method as recited in claim 47, wherein said step of defining a volume of interest comprises defining the shape and size of said VOI.

56. A method as recited in claim 47, wherein said step of segmenting vessels comprises:
applying thresholding with a sufficiently high threshold $T_{high}$, so as to identify vessels and thereby derive a thresholded VOI;
utilizing a process of connected component labeling on the thresholded VOI to find high intensity regions;
utilizing 3dimensional (3D) compactness of said high intensity regions to distinguish vessels from solid components in the GGN;
applying thresholding with a low threshold $T_{low}$, lower than said high threshold $T_{high}$, to obtain a more complete vessel segmentation.

57. A method as recited in claim 47, wherein said step of segmenting vessels comprises applying an intensity constrained dilation so as to include boundary voxels into said vessel segmentation.

58. A method as recited in claim 47, wherein said step of segmenting vessels comprises applying an intensity constrained dilation so as to include boundary voxels into said vessel segmentation and obtain an essentially complete vessel segmentation $O_v$ as follows:

$$O_v=O_{vc}\cup\{\bar{x}|\bar{x}\in(O_{vc}\oplus SE-O_{vc}) \text{ and } I_{\bar{x}\geq Tlow}\},$$

wherein $O_{vc}$ is the vessel core part segmentation obtained from the foregoing step wherein vessels are distinguished from solid components in said GGN, ⊕ denotes morphological dilation, and SE is a dilation structure element, $I_{\bar{x}}$ is an intensity value at location $\bar{x}$, and $T_{low}$ is said lower threshold; and
said step of removing segmented vessels from said initially segmented GGN comprises removing said essentially complete vessel segmentation $O_v$ from said segmented VOI obtained in said step of segmenting said VOI using a Markov random field (MRF) procedure, so as to obtain a final GGN segmentation without vessels $O_{onlyggo}=O_{initggo}-O_v$.

59. A method as recited in claim 58, wherein said dilation structure element is 3×3×3 voxel cube.

60. A method as recited in claim 59, comprising:
applying a morphological opening operation, constrained by intensity, to $O_{onlyggn}$ so as to obtain a cleaned final GGN segmentation $O_{ggn}$, free of any remaining extra branches due to erroneous vessel inclusion resulting from a GGN intensity model including lower intensities than boundary vessel voxels, as follows:

$$O_{ggn}=(O_{onlyggn} \circ SE)-(\{\bar{x}|\bar{x}\in(O_{onlyggn}\circ SE)\}\cap\{\bar{x}| \bar{x}\notin O_{onlyggn}\}\cap\{\bar{x}|I_{\bar{x}}<T_{low}\}),$$

wherein ∘ denotes morphological opening, SE is a structuring element, and wherein in the foregoing equation, the part before the minus sign is the general form of morphological opening, and the part following the minus sign imposes an intensity constraint such that if a pixel added by dilation is lower than the threshold $O_{ggn}$, then this pixel is removed from said cleaned final segmentation.

61. A method as recited in claim 60, wherein said structuring element SE is a 2D disk.

* * * * *

UNITED STATES PATENT AND TRADEMARK OFFICE
CERTIFICATE OF CORRECTION

PATENT NO. : 7,653,225 B2 Page 1 of 1
APPLICATION NO. : 10/942477
DATED : January 26, 2010
INVENTOR(S) : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1306 days.

Signed and Sealed this

Twenty-third Day of November, 2010

David J. Kappos
*Director of the United States Patent and Trademark Office*